United States Patent Office 3,016,337
Patented Jan. 9, 1962

3,016,337
PROCESS FOR DEPYROGENATION AND PURIFICATION OF STREPTOKINASE
Heron Orlando Singher, Plainfield, and Leo Zuckerman, Bound Brook, N.J., assignors to Ortho Pharmaceutical Corporation, a corporation of New Jersey
No Drawing. Filed Apr. 27, 1959, Ser. No. 808,893
3 Claims. (Cl. 195—66)

This invention relates to the depyrogenation and purification of streptokinase. More particularly, the invention relates to a method for the depyrogenation of crude streptokinase by treatment with an ion-exchange agent and purification of depyrogenated streptokinase by precipitation from an acidic aqueous solution with an organic solvent and recovery of the purified precipitated streptokinase.

Streptokinase is valuable and important in the field of medicine because of its ability to activate profibrinolysin to form fibrinolysin, an enzyme capable of lysing fibrin and clotted blood. Pure streptokinase may also have use in the activation of profibrinolysin present in the blood stream by intravenous injection. Profibrinolysin isolated from human blood may be activated by streptokinase to produce fibrinolysin, and the fibrinolysin may be used by intravenous injection to alleviate occlusion of blood vessel by thrombi. In order for fibrinolysin to be suitable for intravenous injection, it is necessary that it be nonpyrogenic and free from inactive proteinaceous materials which might result in allergenic reactions. Accordingly, it is important to prepare substantially pure streptokinase which is non-pyrogenic for use in the treatment of thrombo-embolic phenomena and to produce fibrinolysin suitable for intravenous injection.

An object of the present invention is to provide a method of depyrogenating and purifying crude streptokinase which is simple, economical, and does not require expensive reagents and procedures.

Another object of this invention is to provide a method for depyrogenating and purifying crude streptokinase which is suitable for intravenous injection.

The present invention is based upon the discovery that crude streptokinase may be completely depyrogenated by the treatment of an aqueous solution of streptokinase at a pH of about 7 with the sodium form of an aluminosilicate which is an ion-exchange agent sold by the Permutit Company under the trademark "Decalso," and that substantially pure streptokinase may be obtained from the depyrogenated aqueous solution by adjusting the pH of the solution to about 5, chilling the solution, precipitating streptokinase from the chilled solution by the addition of an organic solvent and recovery of the precipitated depyrogenated and substantially pure streptokinase by centrifugation or filtration.

The process of this invention is particularly adapted for the depyrogenation and purification of crude streptokinase having a concentration of about 250 to 300 units per milligram of dry powdered material. Streptokinase units are expressed in terms of the Christensen unit, Journal of Clinical Investigation, volume 28, page 163 (1949). About one gram of activated Decalso is required to depyrogenate each gram of crude streptokinase having a concentration of about 250 to 300 units per milligram. The Decalso is prepared immediately before use by adding it to 0.5 percent aqueous sodium carbonate solution in the proportion of 1 gram of Decalso for each 10 milliliters of solution. This results in conversion of the Decalso to its sodium form. The mixture is stirred for about one hour and decanted, and the activated Decalso is washed with pyrogen free water until the pH of the wash water is about 7 to 7.5. The crude streptokinase is dissolved in pyrogen free water in an amount such that the protein concentration of the solution is not greater than about 2.0% by weight and preferably about 0.8 to 1.5% by weight. If the protein concentration is above about 2.0% by weight, pyrogens are incompletely removed. The pH of the streptokinase solution is adjusted to about 6.5 to 8.0 by the use of one-tenth normal aqueous sodium hydroxide or one-tenth normal hydrochloric acid. If the pH of the solution is adjusted to below about 6.5, some streptokinase is precipitated and if the pH of the solution is above about 8.0, some inactivation of the streptokinase occurs. About one gram of activated Decalso is added to the solution for each gram of crude streptokinase in solution, the mixture is stirred for about one hour at room temperature, and the streptokinase solution is decanted from the Decalso. If a higher proportion of Decalso is used, an economically high loss of streptokinase occurs.

The resulting solution of pyrogen free streptokinase is used in the preparation of substantially pure streptokinase. The ionic strength of the streptokinase solution is brought to about 0.1 to 0.2 by dilution with pyrogen free water and the addition of a salt which does not denature or inactivate streptokinase. A sodium or potassium salt such as sodium or potassium chloride is preferred. It is preferred that the ionic strength of the solution be about 0.12 to 0.18 and that the protein concentration of the solution be about 0.1% to 0.5% by weight. If the ionic strength is below about 0.1 and the protein concentration is below about 0.1% by weight, and if the ionic strength is above about 0.2 and the protein concentration is above about 0.5% by weight, the purity and yield of the streptokinase obtained is reduced. The pH of the solution of crude streptokinase, which has been adjusted for ionic strength and protein concentration, is adjusted to about 4.9 to 5.1 with one-tenth normal hydrochloric acid and this requires about 0.8 ml. for each 100 ml. of solution. If the pH of the solution is adjusted to less than 4.9 and greater than 5.1, the yield and purity of streptokinase obtained is substantially reduced. The solution is chilled to a temperature of about 0 to about 1° C. and a chilled, low molecular weight and water-miscible organic solvent, such as methanol, ethanol, or acetone is added, the temperature of the organic solvent being sufficiently low so that the temperature of the resulting solution is about −4° to −6° C. The organic solvent is added in an amount such that the concentration of solvent in the solution is about 10 to 30 percent by volume and preferably about 12 to 18 percent by volume. If the concentration of organic solvent in the solution is less than about 10 percent by volume, the yield of streptokinase is very low and if the concentration of organic solvent in the solution is greater than about 30% by volume, a substantial amount of impurities is precipitated with the streptokinase. It is important that the temperature of the streptokinase solution is low at the time the organic solvent is added, otherwise, inactivation and denaturation of streptokinase occurs. The chilled organic solvent is added slowly with stirring to the aqueous streptokinase solution and it is preferred that the organic solvent be chilled to such a temperature that as it is added to the aqueous streptokinase solution, the temperature of the solution is lowered so that when addition of organic solvent is complete, the temperature of the solution is about −4° to −6° C. If the temperature of the solution is above about −4°, there is some denaturation of the streptokinase, and if the temperature of the solution is below about −6° there may be partial freezing of the solution, depending upon the concentration of organic solvent. The solution is stirred and then allowed to stand until precipitation is complete, which usually requires about one-half hour to one hour, during which time the temperature of the solution is maintained at —4° to —6° C. After standing, the solution is centrifuged to obtain the precipitated streptokinase. The temperature of the solution and precipitated streptokinase during centrifugation is maintained at —4° to —6° C. The streptokinase is added to water and brought into solution by adjusting the pH of the suspension to about 6.5 to 7.8 with one-tenth normal aqueous sodium hydroxide solution. The solution of purified streptokinase is centrifuged or filtered to remove any insoluble material present. It is then frozen and lyophilized. An additional amount of purified streptokinase may be obtained from the supernatant obtained from the first centrifugation by adding more organic solvent, and for this purpose an amount of organic solvent sufficient to bring its concentration to not more than about 30% by volume is added. The temperature of the solution during addition is maintained at about —4° to —6° C. and the solution is then allowed to stand at that temperature for about one hour, at which time precipitation is complete. The solution is centrifuged while maintaining its temperature at about —4° to —6° C., and the purified streptokinase obtained is added to water and brought into solution by adjusting its pH with one-tenth normal aqueous sodium hydroxide solution to about 6.5 to 7.8. The solution is centrifuged to remove any insoluble material and is then frozen and lyophilized.

The invention will be described in greater detail in the following examples which will serve to illustrate the invention but is not intended to limit the scope thereof.

*Example I*

Seven grams of crude streptokinase having a total of 1,739,500 units were dissolved in 248 milliliters of water. Seven grams of Decalso, which had been treated with 70 milliliters of 0.5% aqueous sodium carbonate solution and repeatedly washed with distilled water until the pH of the wash water was 7.5, were added to the solution of streptokinase. The solution was stirred for one hour at room temperature and decanted from the Decalso.

*Example II*

The decanted solution obtained from Example I, which had a volume of 246 milliliters and contained 4.135 units of streptokinase per milliliter, was chilled to —5° C. and diluted with 1154 milliliters of distilled water to bring the total volume of the solution to 1400 milliliters. Six grams of sodium chloride were added to bring the ionic strength of the solution to 0.13. Twelve milliliters of one-tenth normal aqueous hydrochloric acid solution was added and the pH of the acidified solution was 4.9. The acidified solution was chilled to 0° C. and 248.5 milliliters of methanol which had been chilled to —10° C. was added slowly to the aqueous solution. The resulting solution was allowed to stand for one hour while the temperature was maintained at —5° C. The streptokinase which precipitated was removed by centrifugation while the temperature of the solution was maintained at —5° C. The supernatant was removed, the precipitate was dissolved in a minimum amount of distilled, pyrogen free water and the pH of the aqueous solution was brought to 7.0 by the addition of one-tenth normal aqueous sodium hydroxide solution. The neutralized solution was frozen and lyophilized and 700 milligrams of purified streptokinase having 1170 units per milligram were obtained.

The supernatant obtained from the centrifugation above, had a volume of 1660 milliliters and additional purified streptokinase was obtained by the addition of 220 milliliters of methanol. The supernatant, methanol and the resulting solution were maintained at —5° C. and allowed to stand for one hour after the addition of methanol was complete.

The precipitated streptokinase was removed by centrifugation. The temperature of the solution during centrifugation was maintained at —5° C. The precipitate was dissolved in a minimum amount of water and the pH of the solution was brought to 7.0 by the addition of one-tenth normal sodium hydroxide solution. The neutralized solution was lyophilized and 730 milligrams of purified streptokinase containing 420 units per miligram were obtained. The first and second precipitates were shown to be nonpyrogenic by injection into rabbits.

What is claimed is:

1. The method of depyrogenating streptokinase which comprises dissolving streptokinase in water in an amount so that the protein concentration of the solution is not greater than about 2.0% by weight, adjusting the pH of the solution to about 6.5 to 8.0, adding a quantity of washed, sodium alumino-silicate thereto so as to preferentially adsorb pyrogens thereon, and removing the sodium alumino-silicate gel to provide a solution of pyrogen free streptokinase.

2. A method according to claim 1 in which the protein concentration of the streptokinase solution is about 0.8 to 1.5% by weight.

3. The method of depyrogenating and purifying streptokinase which comprises dissolving streptokinase in water in an amount so that the protein concentration of the solution is not greater than about 2.0% by weight, adjusting the pH of the solution to about 6.5 to 8.0, adding a quantity of washed sodium alumino-silicate thereto so as to preferentially adsorb pyrogens thereon, removing the sodium alumino-silicate to provide a solution of pyrogen free streptokinase, adjusting the volume of the solution by the addition of pyrogen free water so that the protein concentration of the solution is about 0.1 to 0.5% by weight, adding a salt in an amount sufficient to bring the ionic strength of the solution to 0.1 to 0.2, adjusting the pH of the solution to about 4.9 to 5.1, chilling the solution, adding an amount of chilled low molecular weight, water-miscible organic solvent sufficient to bring the concentration of the solution with respect thereto to about 10 to 30% by volume, the temperature of the resulting solution being about —4° to —6° C., allowing the solution to stand while the temperature thereof is maintained at about —4 to —6° C. until precipitation is complete, and recovering the purified, precipitated streptokinase.

References Cited in the file of this patent

UNITED STATES PATENTS

| 2,677,643 | Ablondi | May 4, 1954 |
| 2,753,291 | Mowat | July 3, 1956 |
| 2,784,145 | Ablondi | Mar. 5, 1957 |
| 2,881,114 | Homan | Apr. 7, 1959 |

OTHER REFERENCES

Fletcher et al.: Proceedings Society for Experimental Biology and Medicine, vol. 94, pp. 233 to 236, published 1957.